(12) United States Patent
Mabe et al.

(10) Patent No.: US 6,685,447 B2
(45) Date of Patent: Feb. 3, 2004

(54) LIQUID COOLED INTEGRATED ROTORDYNAMIC MOTOR/GENERATOR STATION WITH SEALED POWER ELECTRONIC CONTROLS

(75) Inventors: William J. Mabe, Thornton, CO (US); Christopher B. Garlasco, III, Littleton, CO (US); Gail Roberts, Arvada, CO (US); James Larry Jones, Denver, CO (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/056,902

(22) Filed: Jan. 25, 2002

(65) Prior Publication Data

US 2003/0143093 A1 Jul. 31, 2003

(51) Int. Cl.$^7$ .............................. F04B 17/00; F04B 35/04
(52) U.S. Cl. ................................ 417/423.8; 417/424.1; 417/423.14; 310/91; 29/428
(58) Field of Search ........................... 417/423.8, 423.7, 417/423.14, 417, 424.1, 424.2, 366–369, 423.6; 310/42, 91, 112; 29/428, 429, 596

(56) References Cited

U.S. PATENT DOCUMENTS

| | | | | |
|---|---|---|---|---|
| 4,651,897 A | * | 3/1987 | Johnson ........................ 222/55 |
| 4,834,624 A | | 5/1989 | Jensen et al. | |
| 4,990,068 A | * | 2/1991 | Zhong et al. ............. 417/423.8 |
| 5,324,179 A | * | 6/1994 | Nakagawa ................ 417/423.8 |
| 5,332,369 A | * | 7/1994 | Jensen ......................... 417/369 |
| 5,348,452 A | * | 9/1994 | Yamamoto et al. .......... 417/422 |
| 5,443,368 A | | 8/1995 | Weeks et al. | |
| 5,536,148 A | * | 7/1996 | Nishiuchi et al. ............ 417/203 |
| 5,674,056 A | | 10/1997 | Yamamoto et al. | |
| 5,810,568 A | * | 9/1998 | Whitefield et al. ....... 417/423.8 |
| 6,000,912 A | | 12/1999 | Takada et al. | |
| 6,137,416 A | | 10/2000 | Meador | |
| 6,223,523 B1 | | 5/2001 | Frutschi | |
| 6,237,321 B1 | | 5/2001 | Schmid et al. | |
| 6,447,269 B1 | * | 9/2002 | Rexroth et al. ............. 417/365 |
| 6,454,541 B1 | * | 9/2002 | Ijiri et al. ...................... 417/53 |

FOREIGN PATENT DOCUMENTS

| | | |
|---|---|---|
| EP | 0 831 236 A3 | 3/1998 |
| EP | 0 831 236 A2 | 3/1998 |
| JP | 11 324996 A | 11/1999 |
| WO | WO 00/57063 | 9/2000 |

OTHER PUBLICATIONS

International Search Report, dated May 28, 2003.

* cited by examiner

*Primary Examiner*—Justine R. Yu
*Assistant Examiner*—Han L Liu
(74) *Attorney, Agent, or Firm*—Carlson, Gaskey & Olds

(57) ABSTRACT

A rotordynamic system includes a vertically arranged motor, rotordynamic device and controller. The rotordynamic device is a centrifugal pump or compressor operated by the motor to drive a fluid from the input to the output. A liquid cooling system operates to maintain the controller and motor at a desired operating temperature. Due to the liquid cooling system, the controller operates the motor at effectively any practical speed. The liquid cooling system is in heat exchange relationship with an oil system contained within the motor to distribute thermal energy therebetween to further increase thermal control of each.

37 Claims, 4 Drawing Sheets

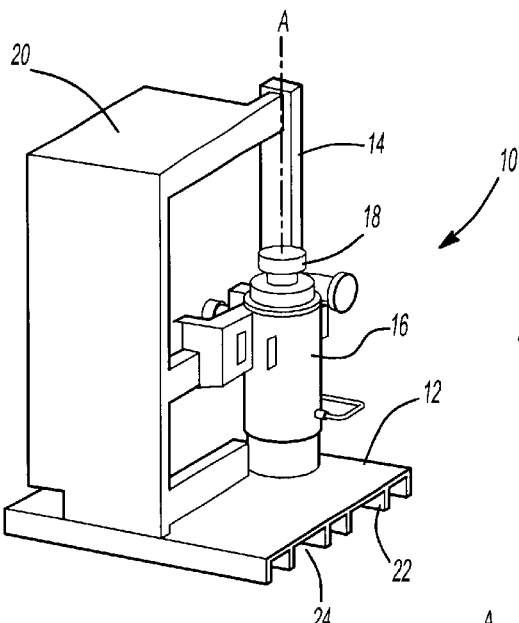
*Fig-1*
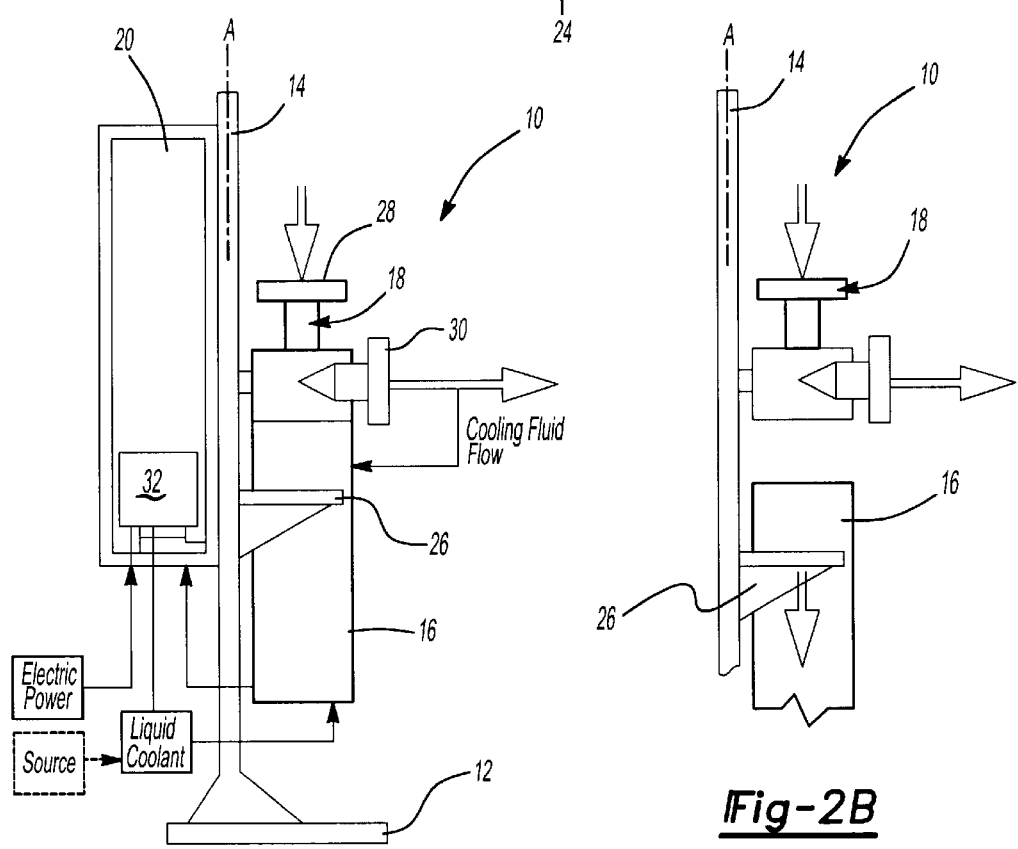
*Fig-2A*
*Fig-2B*

LIQUID COOLED INTEGRATED ROTORDYNAMIC MOTOR/GENERATOR STATION WITH SEALED POWER ELECTRONIC CONTROLS

BACKGROUND OF THE INVENTION

The present invention relates to a rotordynamic system, and more particularly to a vertically arranged liquid cooled rotordynamic and motor/generator station.

Industrial pump and compressor systems are common in processed fluid and gas industries such as hydrocarbon and chemical processing, pulp and paper, water treatment, power generation, and sanitary processing industries worldwide.

Conventional pump and compressor systems typically include a multiple of rather large dispersed components. One type of pump and compressor system having multiple stages is driven by an electric motor to produce high pressure at relatively low flows. Other systems utilize a speed increasing gearbox. The multiple stages and/or gearbox allows the usage of a relatively large air cooled motors which operate at a relatively low speed of approximately 3000–3600 rpm. Disadvantageously, multiple stages and/or gearboxes may result in added complexity, reduced reliability and a rather large system. Moreover, the large air cooled motor is typically relatively noisy during operation.

Other types of conventional pump and compressor systems utilize a variable speed drive. The variable speed drive is relatively complex and must be protected from the environmental conditions adjacent the pump. The variable speed drive is therefore remotely located from the pump or compressor in a separate environmentally controlled room. A separate remotely located controller monitors and controls the disbursed system components. Although providing a rather significant practical speed range, the disbursed system complicates installation.

Accordingly, it is desirable to provide an integrated rotordynamic system having a practically unlimited speed range within a small easily transportable package.

SUMMARY OF THE INVENTION

The rotordynamic system according to the present invention provides a base mounting a vertical support. A motor, a rotordynamic device and a controller are mounted to the vertical support such that a compact, small footprint system is provided. The motor is mounted in a substantially vertical relationship along the vertical support. The rotordynamic device is a centrifugal pump or compressor operated by the motor to drive a fluid from the input to the output, however, a power recovery turbine driving a generator will also benefit from the present invention.

A liquid cooling system operates to maintain the controller and motor at a desired operating temperature. The liquid cooling system is in heat exchange relationship with an oil system contained within the motor to distribute thermal energy therebetween to further increase thermal control of each. The motor is thereby operable through practically any speed range.

The motor includes a hollow shaft which serves as a "dynamic oil pump." Oil flow from an oil sump is induced in the hollow shaft due to rotation and the passage of vapor through radial feed apertures at the top of the shaft. As the oil rises in the shaft, it removes the thermal energy caused by slip of the induction rotor. The radial feed apertures at the top of the shaft throws cooling fluid out into the multiple passages to direct cooling fluid toward the motor housing on the outside of the stator. The passages are oriented and sized to prevent oil from entering the air gap between the rotor and stator. The oil then flows down under the influence of gravity over a set of cooling coils and drains back into the sump. The coils communicate with the liquid cooling system which is arranged in a heat exchange relationship with the gravity assisted liquid return. Thermal energy within the motor is used to provide preheating of the controller and thereby minimize condensation formation and other environmental irregularities.

The present invention therefore provides an integrated rotordynamic system having a practically unlimited speed range within a small easily transportable package.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general perspective view of a rotordynamic system according to the present invention;

FIG. 2A is a schematic view of a rotordynamic system illustrated in FIG. 1 in an operational position;

FIG. 2B is a schematic view of a rotordynamic system illustrated in FIG. 1 in a maintenance position;

DETAILED DESCRIPTION OF THE PREFERRED EMBODIMENT

Figure 3A:
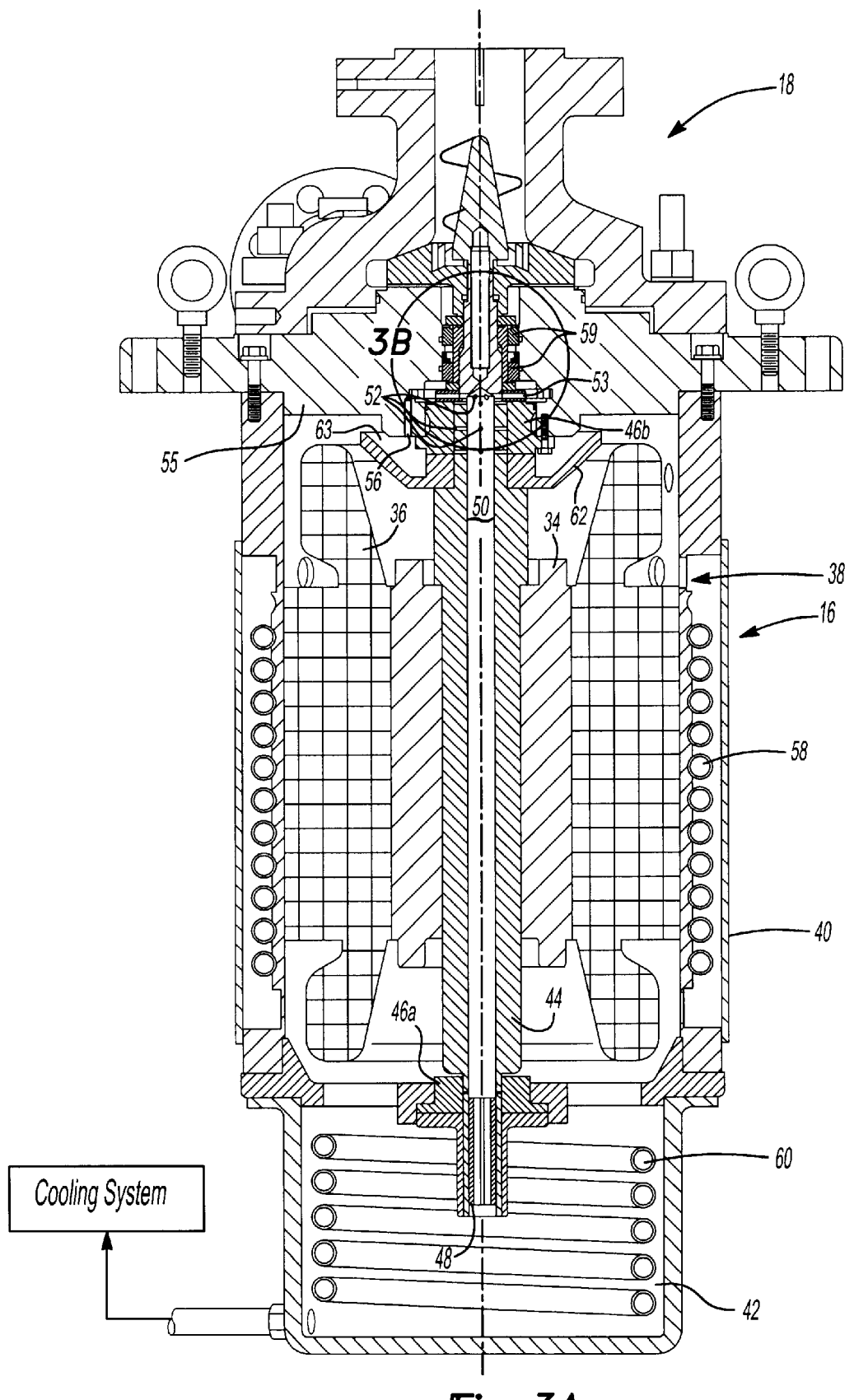
FIG. 3A is a partial sectional view of a motor of the rotordynamic system according to the present invention.

FIG. 1 illustrates a general perspective view of a rotordynamic system 10. The rotordynamic system 10 generally includes a base 12 mounting a vertical support 14 which defines an axis A. A motor 16, a rotordynamic device 18 and a controller 20 are preferably mounted to the vertical support 14 such that a compact, small footprint system 10 is provided. The base 12 includes a plurality of longitudinal members 22 which define a multiple of slots 24 to receive a forklift or the like and thereby assist in transport of the system 10. The vertical support 14 forms a box-like structure for connection to a crane or the like and further assists in conveyance of the system 10.

Referring to FIG. 2A, the motor 16 is mounted in a substantially vertical relationship along the vertical support 14. That is, the motor 16 is mounted parallel to axis A and substantially perpendicular to the base 12.

A movable mount 26 attaches the motor 16 to the vertical support for movement parallel to axis A. Movement of the mount 26 along the vertical support provides for the motor 16 to be separable from the rotordynamic device 18 (FIG. 2B). The mount 26 may be moved along the vertical support 14 by a conventional pulley, ratchet, chain, or the like then locked into one of a plurality of positions. Maintenance of the motor 16 is thereby simplified and the rotordynamic device 18 need not be disconnected from its inputs and outputs (illustrated schematically at 28, and 30).

The rotordynamic device 18 is mounted to the vertical support 14 opposite the base 12. That is, the rotordynamic device 18 is mounted above the motor 16 relative to the base 12. The rotordynamic device 18 is preferably a centrifugal pump or compressor operated by the motor 16 to drive a fluid from the input 28 to the output 30, however, a power recovery turbine driving a generator will also benefit from the present invention. In the power recovery turbine driven generator application, the input and outputs would be reversed as parenthetically illustrated in FIG. 2A.

The controller 20 operates the motor 16 through any speed range, though preferably through a range of 2000 to 100,000 revolutions per minute. The controller 20 is a power electronic system which includes a variable frequency drive as is generally known. The controller 20 is mounted to the vertical support 14 opposite the motor 16 to provide a counterbalance therefor.

A liquid cooling system (illustrated schematically at 32) operates to maintain the controller 20 and motor 16 at a desired operating temperature. The output 30 may additionally be utilized to provide cooling fluid to the motor 16 and/or controller 20. The liquid cooling system 32 may operate with separate cooling fluids or may be a single integrated cooling circuit. Preferably, the liquid cooling system 32 is in heat exchange relationship with an oil system (FIG. 3A) contained within the motor 16 to distribute thermal energy therebetween to further increase thermal control of each. Such thermal transfer is well within the art of cooling system design.

Referring to FIG. 3A, a sectional view of the motor 16 mounted to the rotordynamic device 18 is illustrated. As the motor 16 is vertically oriented, a gravity assisted liquid return 38 (FIG. 3C) is preferably mounted within the motor housing 40. The gravity assisted liquid return 38 includes a sump 42 at the lowest portion of the motor housing 40 adjacent the base 12 (FIG. 1).

Figure 3B:
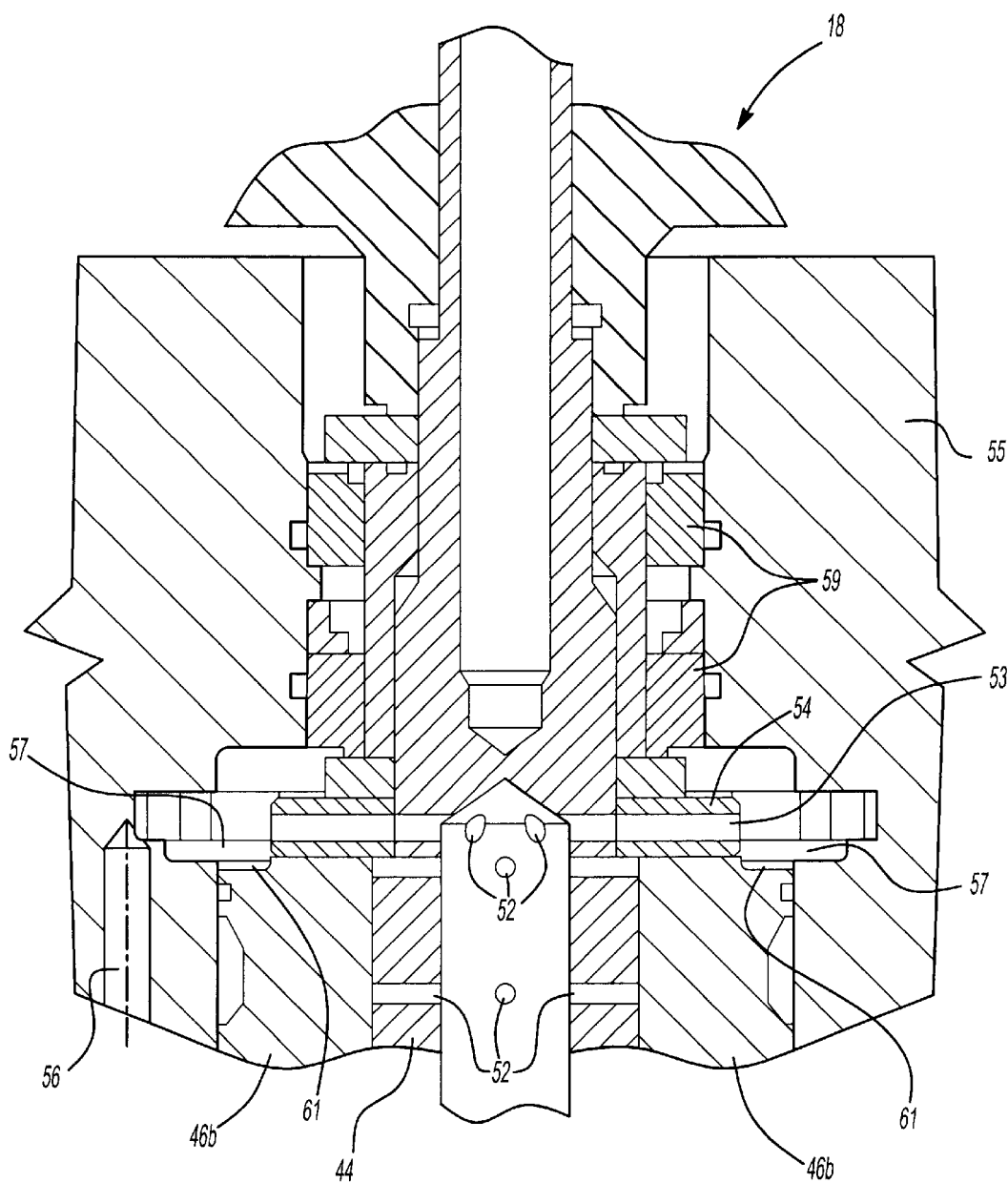
FIG. 3B is an exploded view of the motor illustrated in FIG. 3A.

The motor 16 includes a hollow shaft 44 mounted for rotation within radial bearings 46a, 46b. The bearings 46a, 46b preferably have a generally cylindrical bore with a subtle triangular shape (tri-lobe) for rotational stability. The shaft 44 rotatably mounts a rotor 34 within a fixed stator 36. Axial vanes 48 are located within the hollow shaft at the sump 42 end of the shaft 44 to augment oil flow into the shaft 44. The shaft end 50 opposite the sump 42 includes a multiple of radial feed apertures 52 which communicate oil to a thrust disc 54 mounted within a seal housing 55 (FIG. 3B). The radial feed apertures 52 provide exits for the oil and vapors from the sump 42 and preferably communicate oil through a multiple of thrust disc radial feed apertures 53. The radial feed apertures 52 communicate with a housing annulus 57 which communicates with a multiple of passages 56. Bearings 46a, 46b are fed pressurized oil from via the radial feed apertures 52 in the hollow shaft 44.

Figure 3C:
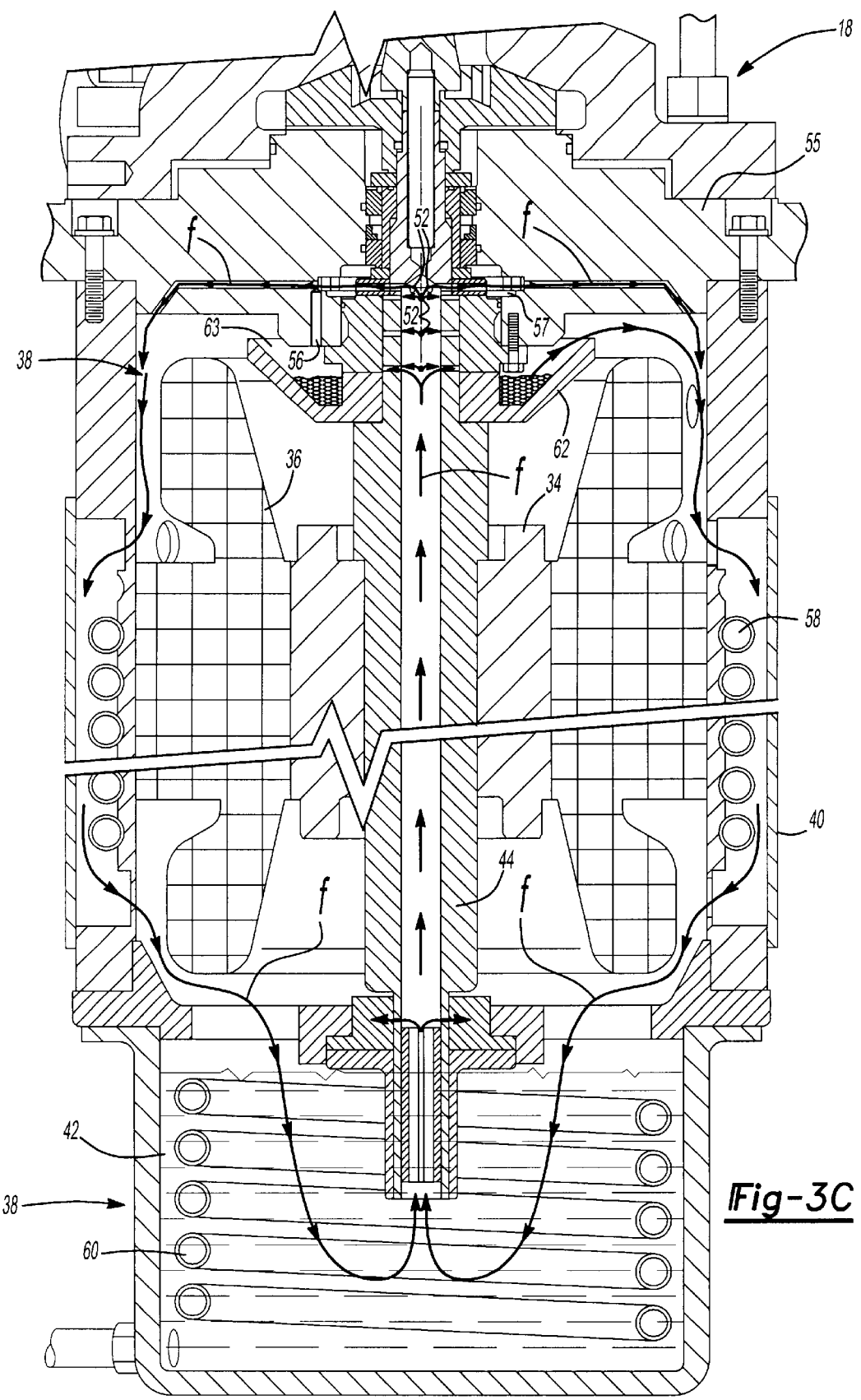
FIG. 3C is a partial sectional view of a motor schematically illustrating a gravity assisted oil flow path.

The thrust disc 54 is mounted adjacent the radial bearing 46b for fluid and vapor extraction through a multiple of passages 56 located through the seal housing 55 adjacent to the outer periphery of the thrust disc 54 (FIG. 3B). A bearing annulus 61 is preferably formed in an upper surface of bearing 46b. Bearing annulus 61 communicates with passages 56 to collect oil and provide for start-up lubrication of thrust disc 54. The combined annulus 57, 61 collect oil such that the rotating components are provided with an immediate source of lubrication during start-up. Longevity of the components is thereby increased as friction from heretofore start-up lubrication deficiency is substantially avoided. It should be understood that although not entirely shown in the sectional view, passages 56 are arranged and direct oil flow outward toward the housing 40 (FIG. 3C). Seals 59 are mounted about the rotordynamic device shaft 60 to prevent oil from entering into the rotordynamic device 18.

An oil slinger 62 is mounted to the shaft 44 adjacent the bearing 46b and opposite the thrust disc 54. The slinger 62 is preferably, frustro-conical or cup like with an open end 63 facing the bearing 46b to collect oil therein during spin down of the shaft 44.

Referring to FIG. 3C, the hollow shaft 44 serves as the "dynamic oil pump." Oil flow (oil flow illustrated schematically by arrows f) from the sump 42 is induced in the hollow shaft 44 due to rotation and the passage of vapor through the radial feed apertures 52 at the top of the shaft 44. Oil from the sump 42 enters the shaft 44 and rises up in a thin layer to a vertical height dependent on the speed of rotation. The axial vanes 48 located at the lower shaft end augment the oil flow at higher speeds approximately greater than 6000. As the oil rises in the shaft, it removes the thermal energy caused by slip of the induction rotor.

The radial feed apertures 52 (FIG. 3B) at the end 50 of the shaft 44 throws cooling fluid out into the multiple passages 56 located in the seal housing 55 adjacent the outer periphery of the thrust disc 54. The passages 56 direct cooling fluid toward the motor housing 40 on the outside of the stator 36. The passages 56 are preferably oriented and sized to direct oil from entering the air gap between the rotor 34 and stator 36. The oil then flows down under the influence of gravity over a set of cooling coils 58 and drains into the sump 42. Another set of cooling coils 60 are additionally or in the alternatively located in the sump 42. The coils 58, 60 preferably communicate with the liquid cooling system 32 (FIG. 2A) which is arranged in a heat exchange relationship with the gravity assisted liquid return 38. Thermal energy within the oil flow within the motor 16 is used to provide preheating of the controller 20 (FIG. 2A) and thereby minimize condensation formation and other environmental irregularities.

Cooling fluid discharged from bearing 46b which does not have sufficient velocity to reach the motor housing 40 is collected in the open end 63 of the oil slinger 62 to prevent cooling fluid from entering the air gap between the rotor 34 and stator 36. During shaft 44 spin down, the slinger 62 fills with oil to provide immediate lubrication for the bearings 46a, 46b during the next start-up.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotordynamic system comprising:
   a base;
   a vertical support mounted to said base;
   a motor mounted in a substantially vertical relationship along said vertical support;
   a rotordynamic device mounted in a substantially vertical relationship along said vertical support, said motor operable to drive said rotordynamic device;
   a controller operable to control said motor, said controller mounted to said vertical support to counter balance said motor; and a liquid cooling system operable to extract heat from said controller.

2. The rotordynamic system as recited in claim 1, wherein said rotordynamic device is mounted to said vertical support.

3. The rotordynamic system as recited in claim 2, wherein said motor is mounted adjacent said base and said rotordynamic device is mounted to said motor opposite said base.

4. The rotordynamic system as recited in claim 2, wherein said controller is mounted opposite said motor.

5. The rotordynamic system as recited in claim 1, wherein said liquid cooling system is in heat exchange relationship with a gravity assisted liquid return within said motor.

6. The rotordynamic system as recited in claim 1, wherein said liquid cooling system comprises a cooling coil located within said motor.

7. The rotordynamic system as recited in claim 1, further comprising a movable mount attached to said motor and said vertical support, said movable mount movable along said vertical mount.

8. The rotordynamic system as recited in claim 1, wherein said rotordynamic device comprises a centrifugal pump.

9. The rotordynamic system as recited in claim 1, wherein said rotordynamic device comprises a compressor.

10. The rotordynamic system as recited in claim 1, wherein said rotordynamic device comprises a power recovery turbine.

11. The rotordynamic system as recited in claim 1, wherein said motor comprises a hollow shaft mounted within a bearing, said bearing defining a bearing annulus adjacent a thrust disc, said bearing annulus operable to retain a quantity of a lubricant.

12. The rotordynamic system as recited in claim 11, wherein said bearing annulus is substantially perpendicular to said hollow shaft.

13. The rotordynamic system as recited in claim 11, wherein a multiple of radial feed apertures in communication with said hollow shaft communicate oil to said thrust disc.

14. The rotordynamic system as recited in claim 11, further comprising a multiple of thrust disc radial feed apertures in communication with said hollow shaft, said multiple of thrust disc radial feed apertures in communication with a housing annulus operable to retain a quantity of a lubricant.

15. The rotordynamic system as recited in claim 1, further comprising a plurality of longitudinal members which extend from said base and define a multiple of slots to receive a forklift.

16. A rotordynamic system comprising:
a base;
a vertical support mounted to said base;
a motor mounted in a substantially vertical relationship along said vertical support;
a rotordynamic device mounted to said motor, said motor operable to drive said rotordynamic device;
a controller operable to control said motor, said controller mounted to said vertical support to counter balance said motor;
a liquid cooling system operable to extract beat from said motor and said controller.

17. The rotordynamic system as recited in claim 16, wherein said motor is mounted adjacent said base and said rotordynamic device is mounted to said motor opposite said base.

18. The rotordynamic system as recited in claim 16, wherein said liquid cooling system is in heat exchange relationship with a gravity assisted liquid return within said motor.

19. The rotordynamic system as recited in claim 16, wherein said liquid cooling system comprises a cooling coil located within a sump.

20. The rotordynamic system as recited in claim 16, wherein said liquid cooling system comprises a cooling coil located about a motor stator.

21. The rotordynamic system as recited in claim 16, further comprising a plurality of longitudinal members which extend from said base and define a multiple of slots to receive a forklift.

22. A rotordynamic system comprising:
a base;
a vertical support mounted to said base;
a motor mounted in a substantially vertical relationship along said vertical support;
a rotordynamic device mounted in a substantially vertical relationship along said vertical support, said motor operable to drive said rotordynamic device;
a controller operable to control said motor, said controller mounted to said vertical support; and
a liquid cooling system operable to extract heat from said controller, said liquid cooling system is in heat exchange relationship with a gravity assisted liquid return within said motor.

23. The rotordynamic system as recited in claim 22, wherein said gravity assisted liquid return comprises a hollow shaft.

24. The rotordynamic system as recited in claim 23, wherein said hollow shaft comprises a plurality of axial vanes adjacent an inlet of said hollow shaft.

25. The rotordynamic system as recited in claim 22, wherein said a gravity assisted liquid return comprises an oil slinger.

26. A rotordynamic system comprising:
a base;
a vertical support mounted to said base;
a motor mounted in a substantially vertical relationship along said vertical support;
a rotordynamic device mounted in a substantially vertical relationship along said vertical support, said motor operable to drive said rotordynamic device;
a controller operable to control said motor, said controller mounted to said vertical support; and
a liquid cooling system operable to extract heat from said controller, said liquid cooling system comprises a cooling coil located within said motor.

27. A rotordynamic system comprising:
a base;
a vertical support mounted to said base;
a motor mounted in a substantially vertical relationship along said vertical support;
a rotordynamic device mounted in a substantially vertical relationship along said vertical support, said motor operable to drive said rotordynamic device, said rotordynamic device comprises a centrifugal pump;
a controller operable to control said motor, said controller mounted to said vertical support; and
a liquid cooling system operable to extract heat from said controller.

28. A rotordynamic system comprising:
a base;
a vertical support mounted to said base;
a motor mounted in a substantially vertical relationship along said vertical support;

a rotordynamic device mounted in a substantially vertical relationship along said vertical support, said motor operable to drive said rotordynamic device, said rotordynamic device comprises a compressor;

a controller operable to control said motor, said controller mounted to said vertical support; and a liquid cooling system operable to extract heat from said controller.

29. A rotordynamic system comprising:

a base;

a vertical support mounted to said base;

a motor mounted in a substantially vertical relationship along said vertical support, said motor comprises a generator;

a rotordynamic device mounted in a substantially vertical relationship along said vertical support, said motor operable to drive said rotordynamic device said rotordynamic device comprises a power recovery turbine;

a controller operable to control said motor, said controller mounted to said vertical support; and a liquid cooling system operable to extract heat from said controller.

30. The rotordynamic system as recited in claim 29, wherein said motor comprises a generator.

31. A rotordynamic system comprising:

a base;

a vertical support mounted to said base;

a motor mounted in a substantially vertical relationship along said vertical support;

a rotordynamic device mounted to said motor, said motor operable to drive said rotordynamic device;

a controller operable to control said motor, said controller mounted to said vertical support;

a liquid cooling system operable to extract heat from said motor and said controller, said liquid cooling system is in heat exchange relationship with a gravity assisted liquid return within said motor.

32. The rotordynamic system as recited in claim 31, wherein said gravity assisted liquid return comprises a hollow shaft.

33. The rotordynamic system as recited in claim 32, wherein said hollow shaft comprises a plurality of axial vanes therein.

34. The rotordynamic system as recited in claim 31, wherein said a gravity assisted liquid return comprises a cup-shaped oil slinger.

35. A rotordynamic system comprising:

a base;

a vertical support mounted to said base;

a motor mounted in a substantially vertical relationship along said vertical support;

a rotordynamic device mounted to said motor, said motor operable to drive said rotordynamic device;

a controller operable to control said motor, said controller mounted to said vertical support;

a liquid cooling system operable to extract heat from said motor and said controller, said liquid cooling system comprises a cooling coil located within a sump.

36. A rotordynamic system comprising:

a base;

a vertical support mounted to said base;

a motor mounted in a substantially vertical relationship along said vertical support;

a rotordynamic device mounted to said motor, said motor operable to drive said rotordynamic device;

a controller operable to control said motor, said controller mounted to said vertical support;

a liquid cooling system operable to extract heat from said motor and said controller, said liquid cooling system comprises a cooling coil located about a motor stator.

37. The rotordynamic system as recited in claim 36, wherein said a gravity assisted liquid return communicates with said a cooling coil located about a motor stator.

* * * * *

UNITED STATES PATENT AND TRADEMARK OFFICE
CERTIFICATE OF CORRECTION

PATENT NO.   : 6,685,447 B2
DATED        : February 3, 2004
INVENTOR(S)  : Mabe et al.

It is certified that error appears in the above-identified patent and that said Letters Patent is hereby corrected as shown below:

Column 5,
Line 60, please change "beat" to read as -- heat --.

Column 6,
Line 32, please delete "a" before "gravity" and after "said".

Column 8,
Line 8, please delete "a" before "gravity" and after "said".

Signed and Sealed this

Thirtieth Day of March, 2004

JON W. DUDAS
*Acting Director of the United States Patent and Trademark Office*